United States Patent
Chamberlin et al.

(10) Patent No.: US 7,868,495 B2
(45) Date of Patent: Jan. 11, 2011

(54) ELECTRIC MOTOR CORE MEMBER

(75) Inventors: Brad Chamberlin, Pendleton, IN (US);
Steven C. Burton, Anderson, IN (US);
Sean Stanley, Huntington, IN (US)

(73) Assignee: Remy Technologies, L.L.C., Pendleton, IN (US)

( * ) Notice: Subject to any disclaimer, the term of this patent is extended or adjusted under 35 U.S.C. 154(b) by 0 days.

(21) Appl. No.: 12/415,184

(22) Filed: Mar. 31, 2009

(65) Prior Publication Data

US 2010/0133947 A1    Jun. 3, 2010

(51) Int. Cl.
*H02K 11/00* (2006.01)

(52) U.S. Cl. .................. 310/71; 310/260; 310/179; 310/180; 310/216.114; 310/216.115; 310/215

(58) Field of Classification Search .............. 310/260, 310/71, 179, 180, 216.114, 216.115, 215, 310/216.119
See application file for complete search history.

(56) References Cited

U.S. PATENT DOCUMENTS

| | | | | | |
|---|---|---|---|---|---|
| 4,219,748 | A | * | 8/1980 | Sakaguchi et al. | 310/71 |
| 4,490,636 | A | * | 12/1984 | McBratney | 310/71 |
| 5,828,147 | A | * | 10/1998 | Best et al. | 310/71 |
| 5,900,687 | A | * | 5/1999 | Kondo et al. | 310/71 |
| 6,600,244 | B2 | * | 7/2003 | Okazaki et al. | 310/71 |
| 6,894,414 | B1 | * | 5/2005 | Asao et al. | 310/179 |
| 6,924,570 | B2 | * | 8/2005 | De Filippis et al. | 310/71 |
| 6,930,418 | B2 | * | 8/2005 | Kobayashi et al. | 310/71 |
| 6,949,848 | B2 | * | 9/2005 | Yamada et al. | 310/71 |
| 7,164,217 | B2 | * | 1/2007 | Kabasawa et al. | 310/71 |
| 7,262,529 | B2 | * | 8/2007 | Klappenbach et al. | 310/71 |
| 7,417,342 | B2 | * | 8/2008 | Engesser et al. | 310/71 |
| 2002/0047365 | A1 | * | 4/2002 | Yagyu et al. | 310/71 |
| 2004/0183388 | A1 | * | 9/2004 | Rittmeyer | 310/179 |
| 2005/0194860 | A1 | * | 9/2005 | Lee | 310/217 |
| 2006/0043806 | A1 | * | 3/2006 | Torii et al. | 310/71 |
| 2006/0091745 | A1 | * | 5/2006 | Klappenbach et al. | 310/71 |
| 2006/0208587 | A1 | * | 9/2006 | Herlet et al. | 310/71 |
| 2006/0261697 | A1 | * | 11/2006 | Baumgartner et al. | 310/180 |
| 2007/0040467 | A1 | * | 2/2007 | Gu | 310/216 |
| 2007/0063598 | A1 | * | 3/2007 | Engesser et al. | 310/71 |
| 2007/0076354 | A1 | * | 4/2007 | Kato et al. | 361/637 |
| 2007/0085531 | A1 | * | 4/2007 | Ijima | 324/207.25 |
| 2007/0103014 | A1 | * | 5/2007 | Sumiya et al. | 310/71 |
| 2007/0232094 | A1 | * | 10/2007 | Hoshika | 439/76.2 |

(Continued)

FOREIGN PATENT DOCUMENTS

DE        3604939 A1 *   8/1987

(Continued)

*Primary Examiner*—Quyen Leung
*Assistant Examiner*—Alex W Mok
(74) *Attorney, Agent, or Firm*—Cantor Colburn LLP

(57) ABSTRACT

An electric motor core member includes a body having an inner diametric portion including an inner arcuate surface and an outer diametric portion including an outer arcuate surface. The electric motor core member further includes a plurality of wall members provided on the main body. Each of the plurality of wall members projects outwardly from the outer arcuate surface and is arranged in a spaced relationship to define a plurality of conductor isolation channels. Each of the plurality of conductor isolation channels is adapted to receive one of a plurality of conductors with the plurality of wall members providing electrical isolation between adjacent ones of the plurality of conductors.

20 Claims, 3 Drawing Sheets

U.S. PATENT DOCUMENTS

| | | | |
|---|---|---|---|
| 2007/0278876 A1* | 12/2007 | Haga et al. | 310/71 |
| 2008/0106161 A1* | 5/2008 | Matsuzaki et al. | 310/71 |
| 2008/0157610 A1* | 7/2008 | Watanabe et al. | 310/43 |
| 2008/0211332 A1* | 9/2008 | Kataoka et al. | 310/71 |
| 2008/0265701 A1* | 10/2008 | Ueda et al. | 310/71 |
| 2009/0039720 A1* | 2/2009 | Tsukashima et al. | 310/71 |

FOREIGN PATENT DOCUMENTS

| | | | |
|---|---|---|---|
| JP | 05168204 A | * | 7/1993 |
| JP | 2000134844 A | * | 5/2000 |
| JP | 2008125278 A | * | 5/2008 |
| JP | 2008301633 A | * | 12/2008 |

* cited by examiner

ELECTRIC MOTOR CORE MEMBER

BACKGROUND

The subject matter disclosed herein relates to the art of electric machines and, more particularly, to a core member for an electric motor.

A multi-phase motor core includes a winding having multiple wire conductors that interact with a back iron core and a plurality of tooth members that form a portion of a stator lamination. Each conductor is wound around an appropriate tooth and then connected to a main conductor for each phase. In the case of a three-phase motor, this may lead to many connections. As such, the multi-phase winding is not a process that is readily automated. More specifically, when constructing multi-phase electric motors, each core winding must be fabricated by hand to ensure proper isolation between phases and neutral as well as robust connection points.

SUMMARY

According to one aspect of the exemplary embodiment, an electric motor core member includes a phase conductor portion including a body having an inner diametric portion including with an inner arcuate surface and an outer diametric portion including an outer arcuate surface. The electric motor core member further includes a plurality of wall members provided on the main body. Each of the plurality of wall members projects outwardly from the outer arcuate surface and is arranged in a spaced relationship to define a plurality of conductor isolation channels. Each of the plurality of conductor isolation channels is adapted to receive one of a plurality of conductors with the plurality of wall members providing electrical isolation between adjacent ones of the plurality of conductors.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
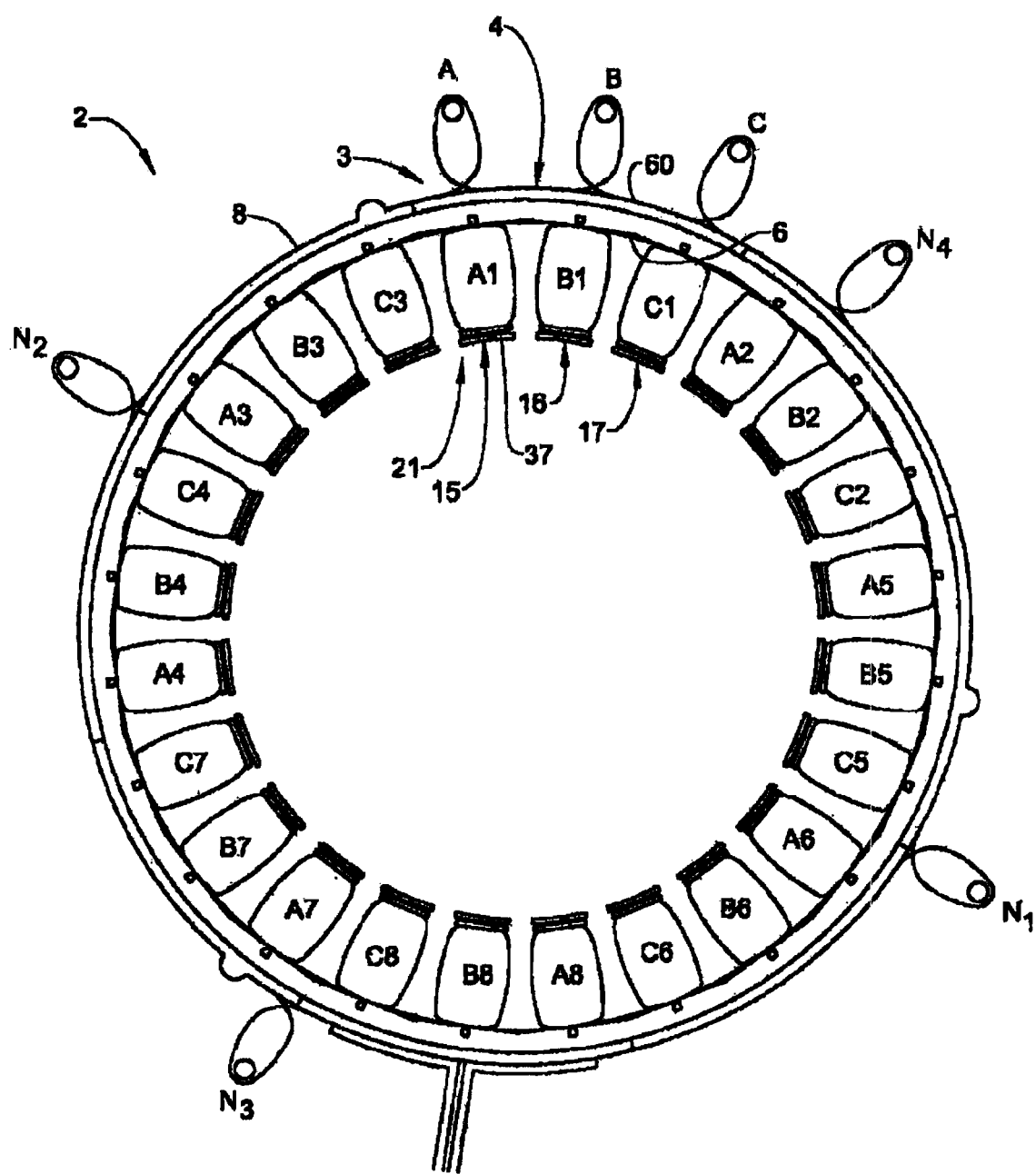
FIG. 1 is an elevational view of a electric motor core member in accordance with an exemplary embodiment.
Figure 2:
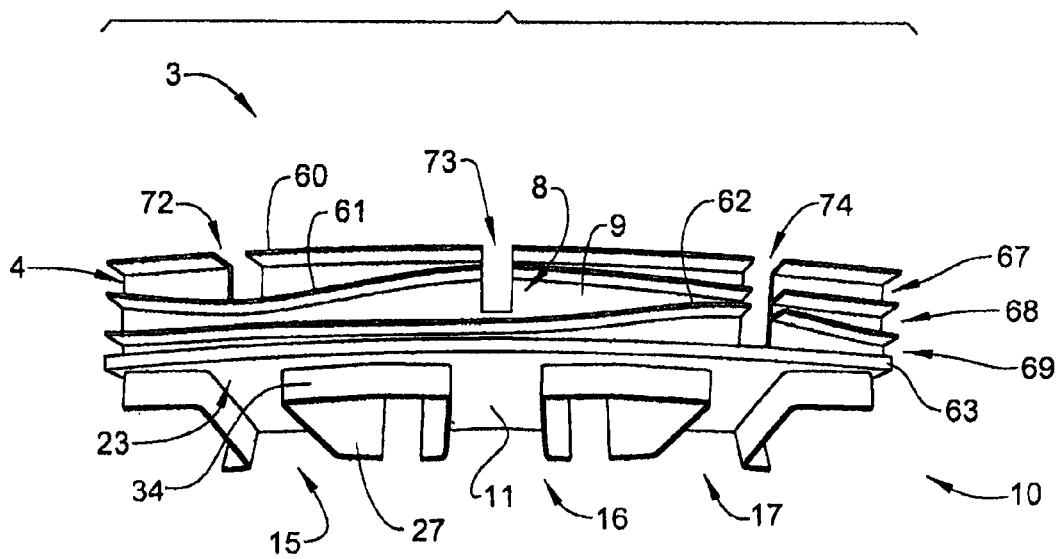
FIG. 2 is an exploded view of a segment of the electric motor core member of FIG. 1.
Figure 2:
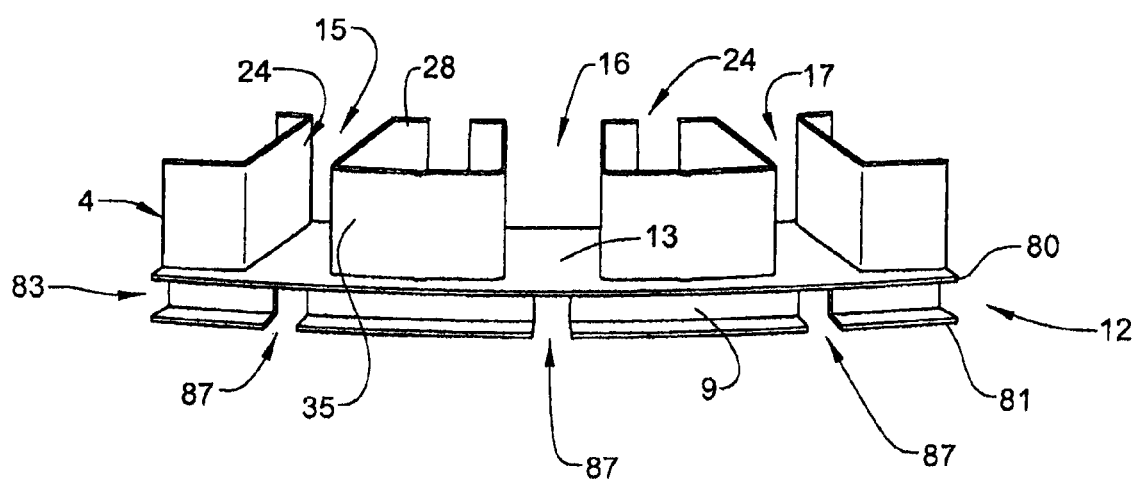
Figure 3:
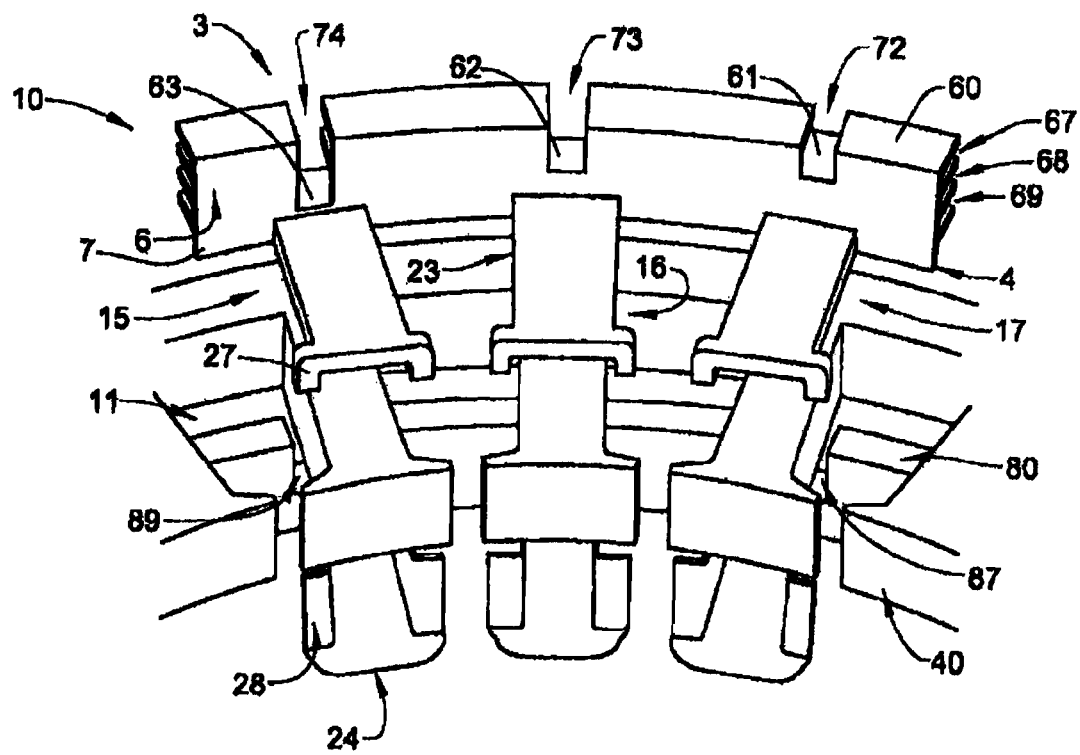
FIG. 3 is an upper front elevational perspective view of the segment of the electric motor core member of FIG. 2.
Figure 4:
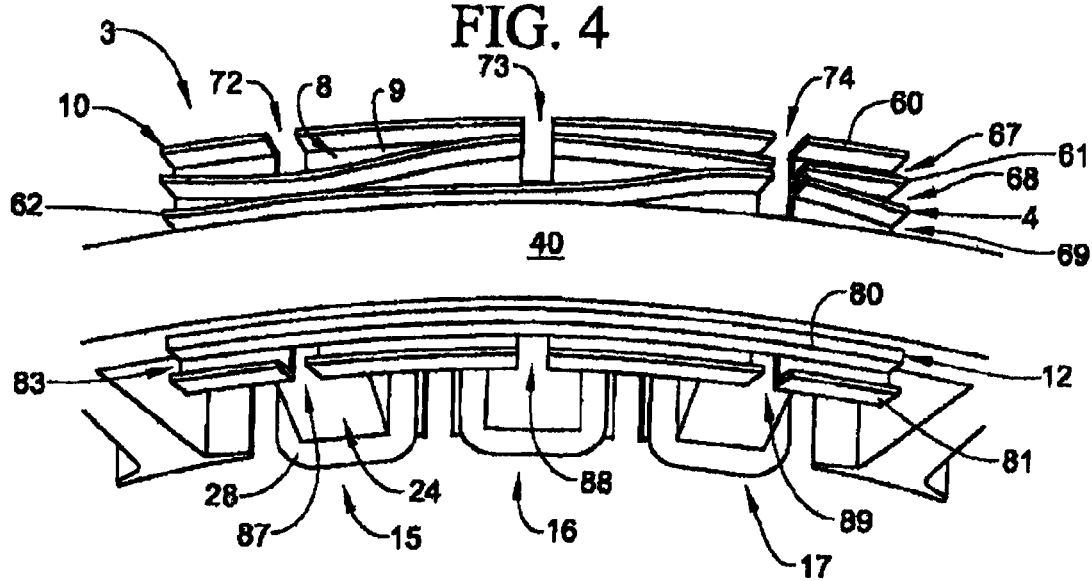
FIG. 4 is a lower rear perspective view of a segment of the electric motor core member if FIG. 1.

With reference to FIGS. 1-4, an electric motor core member for use with a multiple phase (A,B,C) winding including a plurality of poles A1-A8, B1-B8, and C1-C8 constructed in accordance with an exemplary embodiment is generally indicated at 2. In addition to poles A1-A8, B1-B8, and C1-C8, electric motor core member 2 includes neutral leads N1-N4). Electric motor core member 2 is formed from a plurality of segments, one of which is indicated at 3. In the exemplary embodiment shown, electric core member 2 includes eight (8) segments 3. Each segment 3 includes a main body 4 having an inner diametric portion 6 including an inner arcuate surface 7 and an outer diametric portion 8 including an outer arcuate surface 9. As will be detailed more fully below, main body 4 is formed by joining a first or phase conductor portion 10 having at least a first surface portion 11 with a second or neutral conductor portion 12 having at least a first surface section 13. Once phase conductor portion 10 and neutral conductor portion 12 are joined, segment 3 includes a plurality of coil isolator members 15-17. As each coil isolator member 15-17 is substantially identical, a detailed description will follow with respect to coil isolator member 15.

Coil isolator member 15 includes a coil isolator portion 23 that projects laterally outwardly from inner arcuate surface 6 on phase conductor portion 10 and a coil isolator section 24 that projects laterally outwardly from inner arcuate surface 6 on neutral conductor portion 12. Coil isolator portion 23 includes a coil stop portion 27 while coil isolator section 24 includes a coil stop section 28. In addition, phase conductor portion 10 includes a plurality of snap elements, one of which is indicated at 34, that project axially outwardly from first surface section 11. Neutral conductor portion 12 includes a plurality of snap members, one of which is indicated at 35 that project axially outwardly from first surface section 13. With this configuration, phase conductor portion 10 is snap-fittingly joined to neutral conductor portion 12 to form segment 3, with coil isolator member 15 being formed from coil isolator portion 23 and coil isolator section 24. Once formed, coil isolator member 15 includes a coil stop 37 formed by coil stop portion 27 and coil stop section 28. With this arrangement, multiple segments 3 are snap-fittingly joined one to another about a back iron 40 in order to form core member 2.

In accordance with an exemplary embodiment, segment 3 includes a first wall member 60, a second wall member 61, a third wall member 62, and a fourth wall member 63. Each wall member 60-63 extends laterally outward from outer arcuate surface 9. In addition, each wall member 60-63 is spaced one from another in order to form a plurality of conductor isolation channels. More specifically, first and second wall members 60 and 61 form a first conductor isolation channel 67, second and third wall members 61 and 62 form a second conductor isolation channel 68, and third and fourth wall members 62 and 63 form a third conductor isolation channel 69. As will be discussed more fully below, conductor isolation channels 67-69 provide passage for an electrical conductor with wall members 60-63 providing electrical isolation between phase portions of the conductor.

In further accordance with the exemplary embodiments, phase conductor portion 10 includes a plurality of conductor inlet members that provide passage from respective ones of conductor isolation channels 67-69 corresponding ones of coil isolation members 15-17. More specifically, phase conductor portion 10 includes a first conductor inlet member 72 that leads from first conductor isolation channel 67 to coil isolation member 15, a second conductor inlet member 73 that leads from second conductor isolation channel 68 to coil isolator member 16 and a third conductor inlet member 74 that leads from third conductor isolation channel 69 to coil isolator member 17. In order to provide adequate spacing, and access to each coil isolator member 15-17, wall members 60-63 extend across outer arcuate surface 9 in a sinusoidal pattern. In addition to wall members 60-63 on phase conductor portion 10, neutral conductor portion 12 includes a fifth wall member 80 and sixth wall member 81 that project laterally outward from outer arcuate surface 9 to form a fourth conductor isolation channel 83. In a manner also similar to that described above, neutral conductor portion 12 includes a plurality of conductor inlet members 87-89 that provide passage for a neutral conductor to each of the plurality of coil isolation members 15-17. With this arrangement, core member 2 is provided with structure that ensures proper isolation between phases thereby enhancing an over all operational life of the associated electric machine. At this point it should be understood that while shown and described for use with multiple phases, it should be understood that the core member in accordance with the exemplary embodiment can also be employed in connection with single phase windings.

In general, this written description uses examples to disclose exemplary embodiments, including the best mode, and also to enable any person skilled in the art to practice the exemplary embodiment, including making and using any devices or systems and performing any incorporated methods. The patentable scope of the exemplary embodiment is defined by the claims, and may include other examples that occur to those skilled in the art. Such other examples are intended to be within the scope of exemplary embodiments if they have structural elements that do not differ from the literal language of the claims, or if they include equivalent structural elements with insubstantial differences from the literal language of the claims.

The invention claimed is:

1. An electric motor core member comprising:
   a body including an inner diametric portion having an inner arcuate surface and an outer diametric portion having an outer arcuate surface; and
   a plurality of wall members provided on the main body, each of the plurality of wall members projecting outwardly from the outer arcuate surface and being arranged in a spaced relationship to define a plurality of conductor isolation channels, each of the plurality of wall members extending a non-parallel path relative to adjacent others of the plurality of wall members, the non-parallel path establishing pockets that define a conductor connection zone, each of the plurality of conductor isolation channels being adapted to receive one of a plurality of conductors with the plurality of wall members providing electrical isolation between adjacent ones of the plurality of conductors.

2. The electric motor core member according to claim 1, wherein the body includes a phase conductor portion and a neutral conductor portion.

3. The electric motor core member according to claim 2, wherein the neutral conductor portion includes a body including an inner diametric portion having an inner arcuate surface and an outer diametric portion having an outer arcuate surface; and
   a plurality of wall members provided on the main body, each of the plurality of wall members projecting outward from the outer arcuate surface and being arranged in a spaced relationship so as to define a neutral conductor isolation channel, the neutral conductor isolation channel being adapted to receive a neutral conductor; the neutral conductor portion being configured to matingly engage with the phase conductor portion.

4. The electric motor core member according to claim 3, further comprising: a plurality of coil isolator portions provided on one of the phase conductor portion and the neutral conductor portion.

5. The electric motor core member according to claim 4, wherein each of the plurality of coil isolator portions projects outwardly from the inner arcuate surface of the phase conductor portion.

6. The electric motor core member according to claim 4, further comprising: a plurality of coil isolator sections provided on the other of the phase conductor portion and the neutral conductor portion, wherein, the plurality of coil isolator portions are configured to mate with a respective one of the plurality of coil isolator sections to form a respective plurality of coil isolator members.

7. The electric motor core member according to claim 6, wherein, each of the plurality of coil isolator sections project outwardly from the inner arcuate surface of the neutral conductor portion.

8. The electric motor core member according to claim 2, further comprising: a snap element provided on one of the phase conductor portion and the neutral conductor portion.

9. The electric motor core member according to claim 8, wherein the snap element projects axially outwardly from the body of the phase conductor portion.

10. The electric motor core member according to claim 8, further comprising: a snap member provided on the other of the phase conductor portion and the neutral conductor portion, the snap element being adapted to snap-fittingly engage with the snap member to secure the phase conductor portion to the neutral conductor portion.

11. The electric motor core member according to claim 10, wherein the snap member projects axially outwardly from the neutral conductor portion.

12. The electric motor core member according to claim 2, further comprising: a back iron arranged between the phase conductor portion and the neutral conductor portion.

13. The electric motor core member according to claim 1, wherein the plurality of wall members includes a first wall member, a second wall member, a third wall member, and a fourth wall member.

14. The electric motor core member according to claim 13, wherein the plurality of conductor isolation channels includes a first isolation channel formed by the first and second wall member, a second isolation channel formed by the second and third wall member and a third isolation channel formed by the third and fourth wall member.

15. The electric motor core member according to claim 14, further comprising: at least one conductor inlet members formed in the body of the phase conductor portion, the at least one conductor inlet member being formed in at least one of the plurality of conductor isolation channels.

16. The electric motor core member of claim 15, wherein the at least one inlet member includes a first inlet member formed in the first isolation channel, a second inlet member formed in the second isolation channel, and a third inlet member formed in the third isolation channel.

17. The electric motor core member according to claim 1, wherein each of the plurality of wall members extends across the outer arcuate surface in a sinusoidal wave form.

18. The electric motor core member according to claim 1, wherein the electric motor core member is formed from a plurality of segments.

19. The electric motor core member according to claim 18, wherein each of the plurality of segments includes three coil isolator members that project outwardly from the inner arcuate surface.

20. The electric motor core member according to claim 18, wherein the electric motor core member is formed from eight segments.

* * * * *